United States Patent Office 3,322,830
Patented May 30, 1967

3,322,830
2-BROMO-4,5-DIMETHOXYBENZOIC ACID HYDRAZIDE
Tetsuji Kametani, 85 Kitayobancho, Sendai, Japan
No Drawing. Filed Dec. 9, 1963, Ser. No. 329,204
1 Claim. (Cl. 260—559)

This invention relates to a novel chemical compound which is useful as an analgesic and, more particularly, to 2-bromo-4,5-dimethoxybenzoic acid hydrazide.

It is the objective of the present invention to provide a nontoxic analgesic agent. That objective has been achieved by the provision, according to the present invention, of the compound 2-bromo-4,5-dimethoxybenzoic acid hydrazide.

The compound of the present invention is prepared in good yield from veratraldehyde by successive oxidation, esterification, bromination and treatment with hydrazine hydrate according to the following scheme:

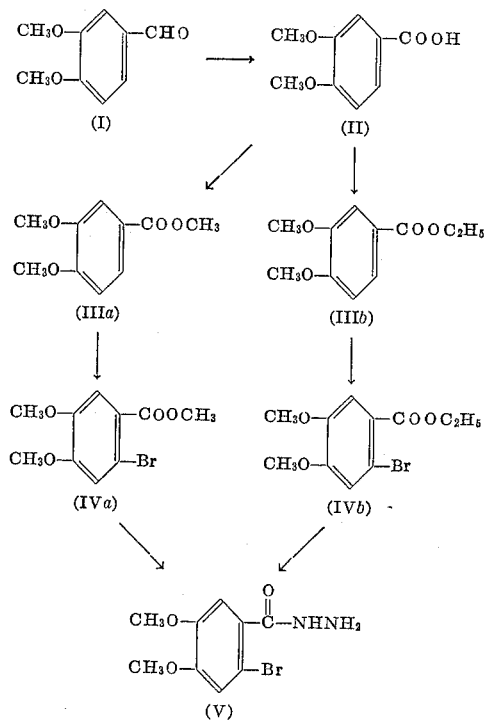

Thus the present invention includes the process for preparing 2-bromo-4,5-dimethoxybenzoic acid hydrazide which comprises the reaction with hydrazine, e.g. hydrazine hydrate, of an ester, e.g. an alkyl ester, of 2-bromo-4,5-dimethoxybenzoic acid or a functional equivalent thereof such as an acid halide, anhydride, mixed anhydride, azide or the like, including the free acid itself.

The following examples given in the experimental section below serve to illustrate the present invention but this invention is not limited thereto. All temperatures are given in degrees Centigrade.

EXPERIMENTAL

Veratric acid (II)

A suspension of 98 g. of veratraldehyde in 600 ml. of water was placed in a 3-liter three-necked flask on a water bath, heated to 60–70° and a solution of 98 g. of potassium permanganate in 1.8 liter of water was allowed to flow into the emulsion of veratraldehyde and water over a period of about 50 minutes with stirring. The stirring and heating were continued for two hours longer. Enough 10 percent potassium hydroxide solution was added to make the solution alkaline. The mixture was filtered while hot and the filter was washed with three 200-ml. portions of hot water. The combined filtrate and washes were cooled, extracted with benzene (which was discarded) and acidified with 10 percent hydrochloric acid, the acid being added until no further precipitate of veratric acid formed. The resulting veratric acid was collected by filtration, washed with water and dried. The yield was 90 g. (88.5% of the theoretical amount) of colorless powder, M.P. 175–177°.

Methyl veratrate (IIIa)[1]

[1] T. Heap, J. G. H. Jones, R. Robinson: J. Chem. Soc., 1927, 2022.

Dry hydrogen chloride gas was passed into a solution of 15 g. of veratric acid in 600 ml. of absolute methanol at 0°. After the reaction mixture was saturated with dry hydrogen chloride, it was concentrated to about 50 ml. A solution of 5 percent sodium bicarbonate was added to make the solution alkaline. The resulting precipitate of methyl veratrate was collected by filtration, washed with water and dried. The yield was 14.5 g. (89.5 percent of the theoretical amount) of colorless needles, M.P. 57–58° (recrystallized from methanol).

Ethyl veratrate (IIIb)

A mixture of 30 g. of veratric acid, 150 ml. of absolute ethanol and 4 ml. of concentrated sulfuric acid was refluxed on a water bath for 12 hours. The reaction mixture was concentrated to about 50 ml. and, after the addition of 300 ml. of water, the ethyl veratrate was extracted into benzene. The benzene layer was washed with a solution of 5 percent sodium bicarbonate and then with water and dried with anhydrous sodium sulfate. The benzene was removed by distillation and the residue was distilled under reduced pressure. The main fraction of the ethyl veratrate distilled as a colorless oil boiling at 130°/3 mm. The yield was 30 g. (90.0 percent of the theoretical amount).

Methyl 2-bromo-4,5-dimethoxybenzoate (IVa)[2]

[2] A. A. Shanshurin: Chem. Abstr., 35, 5870 (1941).

A solution of 5 g. of methyl veratrate (IIIa) in 30 ml. of glacial acetic acid was placed in a 200 ml. three-necked flask fitted with a mechanical stirrer and a dropping funnel. The flask was placed on an ice bath, cooled to 0–5° and a solution of 4.4 g. of bromine in 20 ml. of glacial acetic acid was added slowly over a period of 45 minutes with stirring. The stirring and cooling were continued for an hour longer and water was added until no further precipitate formed. The resulting precipitate of methyl 2-bromo-4,5-dimethoxybenzoate was collected by filtration, washed with water and saturated sodium thiosulfate solution and dried. The yield was 3.5 g. (50% of the theoretical amount) of colorless needles, M.P. 87–89° (recrystallized from methanol).

Ethyl 2-bromo-4,5-dimethoxybenzoate (IVb)

A solution of 10 g. of the above ethyl veratrate (IIIb) in 30 ml. of glacial acetic acid was placed in a 200 ml. three-necked flask fitted with a mechanical stirrer and a dropping funnel. The flask was placed on an ice bath, cooled to 0–5°, and a solution of 8 g. of bromine in 20 ml. of glacial acetic acid was added slowly over a period of 45 minutes with stirring. The stirring and cooling were continued for two hours longer and water was added until no further precipitate formed. The resulting precipitate of ethyl 2-bromo-4,5-dimethoxybenzoate was collected by filtration, washed with water and saturated sodium thiosulfate solution and dried. The yield was 7.5 g. of colorless needles (54.5% of the theoretical amount), M.P. 83–85°.

2-bromo-4,5-dimethoxybenzoic acid hydrazide (V)

(a) A mixture of 5 g. of ethyl 2-bromo-4,5-dimethoxybenzoate (IVb), 5 ml. of ethanol and 5 g. of 80 percent hydrazine hydrate was refluxed gently on a free flame for four hours. After cooling, the resulting crystals of the product, 2-bromo-4,5-dimethoxybenzoic acid hydrazide, were collected by filtration and dried. The yield was 4.5 g. (98% of the theoretical amount) of colorless needles, M.P. 142–143° (recrystallized from ethanol).

*Analysis.*—Calc'd for $C_9H_{11}O_3N_2Br$: C, 39.28; H, 4.00; N, 10.18. Found: C, 38.69; H, 4.33; N, 10.06%.

(b) A mixture of 10 g. of the above methyl ester (IVa), 6 ml. of ethanol and 10 g. of 80 percent hydrazine hydrate was refluxed gently on a free flame for three hours. After cooling, the resulting crystals of the product, 2-bromo-4,5-dimethoxybenzoic acid hydrazide, were collected by filtration and dried. The yield was 8.5 g. (85% of the theoretical amount) of colorless needles, M.P. 142–143°. This was found to be identical with the above hydrazide by mixed melting point test.

The 2-bromo-4,5-dimethoxybenzoic acid hydrazide of the present invention was tested for analgesic activity by the phenylquinone test of Sigmund et al., Proc. Soc. Expt'l Biol. and Med., 95, 729 (1957) in which an analgesic reduces the induced writhing of the mice. At dosages of 150 mgm./kg. p.o. in mice the reduction in induced writhing was found to be 65% for aspirin and 85% for the compound of the present invention. This indicated that 2-bromo-4,5-dimethoxybenzoic acid hydrazide is an analgesic agent with a potency of the order of that of aspirin.

I claim:
  2-bromo-4,5-dimethoxybenzoic acid hydrazide.

References Cited

UNITED STATES PATENTS

| | | | |
|---|---|---|---|
| 2,716,663 | 8/1955 | Beman | 260—559 |
| 2,808,416 | 10/1957 | Bell et al. | 260—398.5 |
| 2,937,118 | 5/1960 | Haxthausen | 167—65 |
| 2,999,880 | 9/1961 | Wheatley et al. | 260—559 |
| 3,063,902 | 11/1962 | Gray et al. | 167—65 |

OTHER REFERENCES

Kametani et al., Jour. Pharm. Soc. (Japan) (Yakugakue Zasshi), vol. 83, pp. 838–44 (September 1963).

Pearl et al., Jour. Amer. Chem. Soc., vol. 77, pp. 3660–3662 (1955).

WALTER A. MODANCE, *Primary Examiner.*

NICHOLAS S. RIZZO, *Examiner.*

R. PRICE, N. TROUSOF, *Assistant Examiners.*